3,094,471
PROCESS FOR THE PREPARATION OF
CIS-p-HYDROXYCINNAMIC ACID
A. Jay Merritt, New Rochelle, and Louis Freedman, Bronxville, N.Y., assignors to U.S. Vitamin & Pharmaceutical Corporation, a corporation of Delaware
No Drawing. Filed July 15, 1960, Ser. No. 42,968
4 Claims. (Cl. 204—158)

This invention is concerned with an efficient process for the preparation of pure cis-p-hydroxycinnamic acid, which in contrast to the readily accessible trans-form, is an effective therapeutic agent.

The prior art does not disclose any convenient or practicable preparation of this cis-acid [Berichte, 46, 260 (1913); ibid., 42, 4865 (1909); ibid., 44, 637 (1911)], although the corresponding trans-acid is readily accessible, and this invention is concerned with the working conditions which afford a practicable photoisomerization of the trans-acid to the cis-acid as shown in the equation below.

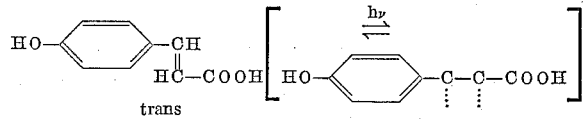 ⇌ 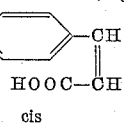

trans                                                  cis

The reaction conditions favoring the displacement of equilibrium of the p-hydroxycinnamic acid in the direction of preponderance of cis, and separation of any residual trans-acid from the formed cis-acid, under efficient, economical and reproducible working conditions, are the especial objects of this invention.

We have now found that irradiation of 0.1–0.5 molar aqueous solutions of metal salts of trans-p-hydroxycinnamic acid adjusted to pH 6.8–9.0 under select irradiation conditions, and particularly wherein the radiant energy is of wave length 2900–3600 A., that preferential activation of the process trans→cis is incurred. The use of the relatively non-arbsorbent aqueous medium not only affords efficient use of the radiant energy, but on completion of the radiation and upon acidification, virtually all of the trans-acid remaining is precipitated, permitting the recovery of substantially pure cis-p-hydroxycinnamic acid in the filtrate by concentration or other techniques.

Additionally, in the practice of this invention, control of temperatures (i.e., not in excess of 40° C.), and an environment substantially free of oxygen are critical and useful conditions; and the comparative speed of the operation coupled with these control features essentially minimizes such undesirable side reactions as reversion to the trans-acid, decarboxylation, oxidation and polymerization. It has now been discovered that elimination of radiation under 2850 A. (which activates the cis-acid) and utilization of radiation in the range 2960–3600 A. (to which the trans-acid is most responsive) give excellent yields of the required cis-acid under the aforesaid working conditions.

Although the cis-cinnamic acid is known in the art to have several crystalline modifications, to this point, explorations with cis-p-hydroxycinnamic acid have afforded only the single crystalline modification as characterized below.

The example which follows will illustrate the invention more fully but is not to be construed as limiting.

Example

A solution of 492 g. (3.0 moles) of trans-p-hydroxycinnamic acid in 6 liters of 0.5 molar sodium hydroxide was diluted with water to a total volume of 9.0 liters. This solution (pH 7.0) was then circulated in a nitrogen atmosphere over a period of 24 hours, while maintaining the temperature at 10–20° C. by external cooling, at the rate of approximately 380 ml. per minute through a jacketed high pressure mercury lamp fitted with a Corex D filter sleeve. (In this study a high pressure mercury vapor lamp was employed, model No. 79A obtained from the Hanovia Corp., Newark, N.J. This lamp emits 4.3 watts at 2967 A., 7.2 watts at 3025 A. and 13.2 watts at 3130 A. The Corex D filter was also obtained from the Hanovia Corp. and served to absorb radiation below 2850 A. Other sources for radiation in this region may be employed.)

At the end of the radiation period, addition of 3 moles of hydrochloric acid afforded pH 2.5, and 122 g. (25%) of trans-p-hydroxycinnamic acid was precipitated and separated, M.P. 215–216° C. The filtrate containing the substantially soluble cis-p-hydroxycinnamic acid, on concentration under reduced pressure to a volume of about 1.8 liters and after cooling at 0–10° C. for 20 hours, gave 344 g. of cis-p-hydroxycinnamic acid (93%, based on trans-acid unconverted) as a white crystalline product, M.P. 130–131° C., λmax 262 mμ (ε 11,900) (water); λmax 290 mμ (ε 14,800) (0.1 N NaOH).

A number of alternative working conditions are employed, as for example, immersion of the ultraviolet source in a solution of the metal trans-p-hydroxycinnamate salt.

In addition to irradiation of the solution of the sodium salt of the trans-acid, the following metal salt solutions may be used: the other alkali metals potassium and lithium, as well as calcium and magnesium. Such salts as the barium, aluminum or zinc salts are not sufficiently soluble in water to afford desirable working conditions, and the ammonium salt is not acceptable being reactive to the ultraviolet radiant energy.

The pH of the irradiated solution is desirably maintained between 6.8–9.0. At lower pH values, mixtures of the salt and the insoluble free trans-acid are obtained, while at pH values above 9.0 the efficiency of the process and the purity of the product are impaired.

The irradiated solution for practicable conversion is desirably controlled between 0.1–0.5 molar concentration, with less efficiency being achieved if still lower concentrations are used, and contingent loss of some cis-acid upon removal of the trans-acid when higher concentrations are used. Higher molarities of trans-acid salt solutions can be irradiated, and the solution then diluted with water to 0.5 molar concentration before acidification.

The temperature of the irradiated solution is maintained as low as is consistent with fluidity, and desirably in the range of about 10–25° C. If the temperature exceeds 40° C., decarboxylation and other side reactions give poorer yields, tarry side products and undesirably colored product.

In the concentration of the filtrate, similar precautions as to temperature need be observed to prevent undesirable side reactions. Although preferably, the desired cis-p-hydroxycinnamic acid is obtained by concentration of the acidified filtrate as above, other means may be used; alkalinizing the acidified filtrate and reacting the cis-p-hydroxycinnamic acid with methyl chloroformate causes the cis-p-hydroxycinnamic acid to precipitate as its carbomethoxy derivative; addition of aluminum chloride to the acidified filtrate followed by neutralization with sodium hydroxide yields a precipitate of the cis-p-hydroxycinnamic acid aluminum salt. Additionally, the cis-p-hydroxycinnamic acid is isolable from the aqueous filtrate by column chromatography, or by extraction with waterimmiscible solvents such as ethyl acetate, diethyl ether, butyl alcohol and the like.

In the process of this invention, non-oxidizing conditions should prevail. This is achieved either by removal of air, and preferably by utilizing a stream of nitrogen to replace the air. Other inert gases such as helium, argon and the like may be employed. If the operation is conducted in the presence of substantial quantities of air, the product is obtained colored (tan) and has a lower melting point.

The duration of the irradiation varies directly with the concentration of the salt solution employed, and inversely with the speed of circulation and the intensity of the radiant energy. Under these circumstances, adjustment of these variables to afford the product of maximum purity and yield, follows procedures well known to those skilled in the art.

As distinct from the herein discovered reaction condition for conversion of trans to cis-p-hydroxycinnamic acid, the attempted conversion of trans to cis-cinnamic acid employing similar principles was ineffective. Similarly, other substituted trans-cinnamic acids such as caffeic, ferulic and sinapic acid cannot be isomerized to afford pure or clean corresponding cis-analogs.

The pure cis-p-hydroxycinnamic acid obtained by the process of this invention can be combined with solid or liquid pharmaceutical carriers and formulated into the form of tablets, powder packets or capsules, or as ointments or creams, or dissolved in suitable solvents for oral and parenteral administration for human and veterinary use.

It is to be understood that it is intended to cover all changes and modifications of the example herein chosen for the purpose of illustration which do not constitute departures from the spirit and scope of the invention.

We claim:

1. A process for the preparation of cis-p-hydroxycinnamic acid by photoisomerization of trans-p-hydroxycinnamic acid, which comprises subjecting to irradiation in a substantially nonoxidizing atmosphere with light of a wave length within the range of at least 2850 A. and up to at least 3600 A. an aqueous solution having a concentration of from about 0.1 to about 0.5 molar and a pH within the range from about 6.8 to about 9 of a salt of trans-p-hydroxycinnamic acid and a metal, said metal being inert to light of the stated wave length, until trans-acid is photoisomerized to cis-acid, adding an acid in an amount to effect precipitation of nonisomerized trans-acid, and recovering cis-acid from the resulting solution.

2. A process according to claim 1, wherein the irradiation is carried out at a temperature below 40° C.

3. A process according to claim 1, wherein the trans-p-hydroxycinnamic acid salt is a salt of a metal selected from the group consisting of sodium, potassium, lithium, calcium and magnesium.

4. A process according to claim 3, wherein the metal is sodium.

References Cited in the file of this patent

Ellis et al.: The Chemical Action of Ultraviolet Rays (1941), pages 482–484.